United States Patent
Lathrop et al.

(10) Patent No.: US 10,451,428 B2
(45) Date of Patent: Oct. 22, 2019

(54) AUTOMATIC DRIVING ROUTE PLANNING APPLICATION

(71) Applicants: VOLKSWAGEN AKTIENGESELLSCHAFT, Wolfsburg (DE); AUDI AG, Ingolstadt (DE)

(72) Inventors: William Brian Lathrop, San Jose, CA (US); Peter Oel, Redwood City, CA (US); Daniel Lipinski, Redwood City, CA (US); Erik Glaser, San Francisco, CA (US); James Leigh Toggweiler, San Francisco, CA (US); Nathaniel Coser, Palo Alto, CA (US)

(73) Assignees: VOLKSWAGEN AKTIENGESELLSCHAFT, Wolfsburg (DE); Audi AG (DE)

( * ) Notice: Subject to any disclaimer, the term of this patent is extended or adjusted under 35 U.S.C. 154(b) by 730 days.

(21) Appl. No.: 15/501,189

(22) PCT Filed: Mar. 3, 2014

(86) PCT No.: PCT/EP2014/054084
§ 371 (c)(1),
(2) Date: Feb. 2, 2017

(87) PCT Pub. No.: WO2014/139821
PCT Pub. Date: Sep. 18, 2014

(65) Prior Publication Data
US 2017/0219364 A1    Aug. 3, 2017

Related U.S. Application Data

(60) Provisional application No. 61/798,341, filed on Mar. 15, 2013.

(51) Int. Cl.
    *G01C 21/34*     (2006.01)
    *G01C 21/36*     (2006.01)
    *G05D 1/02*     (2006.01)

(52) U.S. Cl.
    CPC ......... *G01C 21/3453* (2013.01); *G01C 21/36* (2013.01); *G05D 1/02* (2013.01); *G01C 21/34* (2013.01)

(58) Field of Classification Search
    CPC .... G01C 21/34; G01C 21/3453; G01C 21/36; G05D 1/02
    See application file for complete search history.

(56) References Cited

U.S. PATENT DOCUMENTS 7,865,298 B2    1/2011    Macneille et al.
9,188,985 B1 *   11/2015    Hobbs .................... G01C 21/34
(Continued)

FOREIGN PATENT DOCUMENTS

EP    0913751 A1    5/1999
EP    1308812 A2    5/2003
(Continued)

OTHER PUBLICATIONS

Office Action for Korean Patent Application No. 10-2015-7029850; dated Nov. 2, 2016.
(Continued)

*Primary Examiner* — Thomas E Worden
(74) *Attorney, Agent, or Firm* — Barnes & Thornburg LLP (57) ABSTRACT

A method and system is provided for a semi-autonomous vehicle to have optional routes that vary in an amount of autonomous driving offered. The system performs processes including aggregating data from various sources to thereby position and orient the vehicle, assigning an autonomous driving value to different route segments, determining an
(Continued)

optimal route by minimizing a distance between a start position and a destination position and maximizing the percent autonomous value assigned, and displaying the optimal route.

18 Claims, 7 Drawing Sheets

(56) References Cited

U.S. PATENT DOCUMENTS

| | | | |
|---|---|---|---|
| 9,754,490 B2* | 9/2017 | Kentley | G06K 9/00805 |
| 10,042,359 B1* | 8/2018 | Konrardy | G05D 1/0088 |
| 2002/0120396 A1 | 8/2002 | Boies et al. | |
| 2008/0183381 A1 | 7/2008 | Machino | |
| 2010/0312466 A1 | 12/2010 | Katzer et al. | |
| 2014/0169630 A1* | 6/2014 | Fukata | G08G 1/167 |
| | | | 382/103 |
| 2014/0226010 A1* | 8/2014 | Molin | G06Q 10/06 |
| | | | 348/148 |
| 2016/0229414 A1* | 8/2016 | Desnoyer | B60W 50/0097 |
| 2016/0231855 A1* | 8/2016 | Bendewald | B60W 50/14 |
| 2017/0010613 A1* | 1/2017 | Fukumoto | G08G 1/096827 |
| 2017/0124658 A1* | 5/2017 | Gordon | G06Q 40/08 |
| 2017/0259832 A1* | 9/2017 | Lathrop | B60W 50/14 |
| 2017/0322041 A1* | 11/2017 | Stephens | G05D 1/0088 |
| 2017/0356746 A1* | 12/2017 | Iagnemma | G05D 1/0088 |
| 2017/0356748 A1* | 12/2017 | Iagnemma | G05D 1/0088 |
| 2017/0370740 A1* | 12/2017 | Nagy | G01C 21/3484 |
| 2018/0061242 A1* | 3/2018 | Bavar | B60W 50/082 |
| 2018/0075538 A1* | 3/2018 | Konrardy | G06Q 40/08 |
| 2018/0107216 A1* | 4/2018 | Beaurepaire | B60W 50/08 |
| 2018/0224286 A1* | 8/2018 | Pickering | G01C 21/34 |

FOREIGN PATENT DOCUMENTS

| | | |
|---|---|---|
| JP | 06083445 A | 3/1994 |
| JP | 200600189415 A | 7/2006 |
| JP | 2011150516 A | 8/2011 |
| WO | 2012086029 A1 | 6/2012 |

OTHER PUBLICATIONS

Search Report and Written Opinion for International Patent Application No. PCT/EP2014/054084; dated Jun. 18, 2014.
International Preliminary Report on Patentability for International Patent Application No. PCT/EP2014/054084; dated Sep. 15, 2015.
Office Action for Chinese Patent Application No. 201480015792.8; dated Mar. 23, 2017.

* cited by examiner

AUTOMATIC DRIVING ROUTE PLANNING APPLICATION

CROSS-REFERENCE TO RELATED APPLICATIONS

This patent application is a U.S. National Phase of International Patent Application No. PCT/EP2014/054084, which was filed on Mar. 3, 2014, which claims priority to U.S. Provisional Application No. 61/798,341, which was filed on Mar. 15, 2013, the disclosures of which are incorporated by reference in their entirety herein.

TECHNICAL FIELD

The present disclosure relates to vehicle navigation systems and more specifically to an automatic driving route planning application running on navigation equipment within a vehicle or running on a mobile device.

BACKGROUND

Today's navigation applications on mobile devices such as smart phones, desktop computers, or in-vehicle navigation systems assist users in devising optimum travel routes to destinations, help users understand vehicle orientation and direction of travel, illustrate various places of interest, and inform the driver about driving conditions on a road network (e.g., traffic density, weather, accidents, construction, etc.).

Some recent advances within the navigation systems include algorithms and interfaces that perform optimization of route planning according to carbon footprint (e.g., eco-driving route planning), battery efficiency (e.g., electric vehicle route planning), comfort (e.g., scenic route planning), and safety (e.g., avoid high crime area route planning). Others have proposed various systems and methods for determining the optimum route to a destination. However, such conventional systems are focused specifically on defining systems and methods for optimizing route plans with non-autonomous vehicles, meaning that routes are ultimately selected only through the physical decisions and actions of the user after taking into account historical data, weather conditions, traffic density, and a host of other variables that can impact travel time and/or distance. The conventional art, however, does not provide a system and method for planning and optimizing routes for semi-autonomous and/or fully autonomous vehicles, which limit and even eliminate the need for user interaction. Moreover, the conventional art does not factor in variables to calculate a percentage of a route that can be driven autonomously with a vehicle that has the requisite technology to do so.

SUMMARY

In view of the foregoing and other exemplary problems, drawbacks, and disadvantages of the conventional methods and structures, an exemplary feature of the present disclosure is to provide a system and method suitable for autonomously and/or semi-autonomously planning and optimizing a route to a specific destination desired by a user.

Under certain exemplary embodiments, a system and method is disclosed for planning and calculating routes for a vehicle that has the requisite technology to drive autonomously, without human input or intervention, for the entire length (e.g., fully autonomous vehicle) or a portion (semi-autonomous vehicle) of a planned route. To this end, a method and system tangibly embodied in a computer software application deployed on a processing device, such as a smartphone, tablet, laptop, desktop computer, or in-vehicle navigation system, is disclosed for planning and calculating a route for the user of a vehicle that has a certain degree of automatic driving capability (e.g., semi-autonomous vehicle).

Under at least one exemplary embodiment, a system is disclosed for processing and optimizing a route to a specific destination via a vehicle that has the capability to drive autonomously. The system may include a data collection device configured to aggregate data from various sources to thereby position and orient the vehicle, a component configured to assign a percent autonomous value to different route segments, a selection component configured to minimize a distance between a start position and a destination position and configured to maximize the percent autonomous value assigned, and a display adapted to display at least one route.

Under at least one exemplary embodiment, a method is disclosed for planning and optimizing a route to a specific destination via a vehicle that has the capability to drive autonomously. The method may include the operations of aggregating data from various sources to thereby position and orient the vehicle, assigning a percent autonomous value to different route segments, determining an optimal route by minimizing a distance between a start position and a destination position and maximizing the percent autonomous value assigned, and displaying the optimal route.

Under at least one exemplary embodiment, a system is disclosed that includes a route device configured to calculate a plurality of routes to a destination. One or more of the routes may comprise a plurality of route segments. The system may include a data collection device configured to aggregate route planning data from a plurality of sources, a calculating device configured to calculate a percent autonomous value for each of the plurality of route segments of each of the plurality of routes, and a route optimizing component configured to determine an optimal route to the destination based on the length of each route and the percent autonomous value for each route segment.

Under yet at least one exemplary embodiment, a method of navigating a vehicle is disclosed, wherein the method comprises the operations of entering a destination, generating a plurality of routes to a destination, the routes each having a length, assigning a percent autonomous value to each of the plurality of routes, and presenting each of the plurality of routes to a user, wherein each of the routes indicating the percent autonomous value and the length of the route, selecting one of the plurality of routes and operating the vehicle along the selected route.

Further scope of applicability of the present disclosure will become apparent from the detailed description given hereinafter. However, it should be understood that the detailed description and specific examples, while indicating preferred embodiments, are given by way of illustration only, since various changes and modifications within the spirit and scope of the invention will become apparent to those skilled in the art from this detailed description.

BRIEF DESCRIPTION OF THE FIGURES

The present disclosure will become more fully understood from the detailed description given herein below and the accompanying drawings which are given by way of illustration only, and thus, do not limit the present disclosure, and wherein.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

DETAILED DESCRIPTION

Autonomous vehicles (also known as driverless cars, self-driving cars or robot cars) are an autonomous vehicle capable of fulfilling the human transportation capabilities of a traditional car. As an autonomous vehicle, it is capable of sensing its environment and navigating without human input. Autonomous vehicles may be equipped with a high precision GPS navigation system and several laser scanners which it uses to detect obstacles. Autonomous vehicles may also be configured to sense their surroundings using technologies such as radar, Light Detection and Ranging (LIDAR), GPS, and computer vision. Advanced control systems interpret sensory information to identify appropriate navigation paths, as well as obstacles and relevant signage. Some autonomous vehicles update their maps based on sensory input, allowing the vehicles to keep track of their position even when conditions change or when they enter uncharted environments. Semi-autonomous (or quasi-autonomous) vehicles are vehicles that are capable of switching between an autonomous mode and a driver-controlled mode, and/or vehicles that are configured with autonomous driving features but require some driver input.

Navigation systems, and particularly automotive navigation system, are typically embodied as a GPS navigation device used to acquire position data to locate the user on a road in a unit's map database. Using the road database, the unit can give directions to other locations along roads also in its database. Deduced reckoning (or "dead reckoning") that uses distance data from sensors attached to the drivetrain, a gyroscope and an accelerometer can be configured for greater reliability, as GPS signal loss and/or multipath can occur due to urban canyons or tunnels.

While conventional navigation systems are configured to provide navigational data and guidance based on factors such as distance traveled, traffic, highway travel, etc., few, if any, navigation systems account for autonomous and/or semi-autonomous driving factors. As autonomous and semi-autonomous vehicles become more commonplace in commercial and/or consumer use, navigation systems will need to adapt so that navigational data and guidance includes autonomous driving factors.

An automatic driving route planning application (ADRPA) is an one important component for semi-autonomous vehicles, and may fall into one of at least two types of autonomic driving capability categories: a first type is referred to as a Destination Not Set (DNS) and a second type can be called a Destination Set (DS). Certain DNS systems may be configured to provide a combination of adaptive cruise control (ACC) and Active Lane Guidance (ALG). The combination of these two technologies essentially means the vehicle is automatically controlling both the longitudinal and lateral movements of the vehicle, albeit in very limited driving contexts. In this configuration, the vehicle is performing automated driving, but is not performing automated navigation. That is, the vehicle has no idea where it is going, what the destination is, or even what the next upcoming maneuver is.

The DS category combines autonomous driving and navigation. The combination of these two technologies means that not only is the vehicle automatically controlling both the longitudinal and lateral movements of the vehicle, but it is also making decisions about upcoming maneuvers that are required to reach a destination. This type of vehicle, therefore, is performing automatic driving and navigation. Thus, the DS category of semi-autonomous vehicles, according to certain exemplary embodiments disclosed herein, is a focus of the various systems and methods for planning and calculating routes. Planning of a route for a vehicle that has some degree of autonomous driving capability may be advantageous, particularly where a destination may be known, along with alternative routes to the destination, and each alternative route affords different amounts of autonomous driving.

According to certain exemplary embodiments disclosed herein, systems and methods are configured to process, plan and optimize a route to one or more destinations using a semi-autonomous or fully autonomous vehicle (e.g., an automatic driving route planning application or "ADRPA"). Route optimization for typical navigation systems are mostly concerned with analyzing parameters of travel time and/or distance, and reducing one and/or the other. In other configurations, navigation systems may be optimized according to parameters set by a user, such as the avoidance to toll roads, traveling along a scenic route, etc. In certain exemplary embodiments disclosed herein, a navigation system may be configured to process any and all of the conventional navigation parameters, and further process parameters basing on an autonomous value for given routes and/or route segments (e.g., a percentage of a route that can be driven autonomously). As will be seen in the disclosure herein, the autonomous value is referred to as "Percent Autonomous" (PA). It should be appreciated by those skilled in the art, that, while the autonomous value is depicted as a percentage, various other values, ratios, and numerical relationships are contemplated in this disclosure.

The PA value is advantageous as a navigation optimization parameter, particularly for a driver of a semi-autonomous vehicle because, as a practical matter, it is not likely that all possible routes between two locations are capable of being driven 100% autonomously. During operation, a semi-autonomous vehicle may not have data pertaining to one or more segments of a navigational route. This lack of data may be the result of: (1) the data having never been collected and stored into a database for subsequent use by automated vehicles; (2) the data that was collected was not of sufficient quality for subsequent use by automated vehicles; and/or (3) the data that was collected for subsequent use by automated vehicles is no longer useful because the physical characteristics of the navigational roadway on which the data is based are no longer visible, or obscured by dynamic environmental elements (e.g., snow, rain or ice covers the roadway). It also might be the case that the data was collected and is generally suitable for navigation, but restrictions on the route (e.g., private property/road, school zone) prevent it from being utilized.

Under certain exemplary embodiments, a navigation system may be configured to process a variety of data for purposes of route planning and optimization for a semi-autonomous vehicle. This data can come from a variety of sources (e.g., aerial, satellite, and terrestrial laser scans and photography, etc.). Such data may be used for automatic driving for positioning, orienting, and navigating the vehicle and to provide an accurate representation of the surrounding environment with respect to roads, buildings, structures, mountains, etc. Furthermore this data may be processed for route planning and optimization. For example, it is possible that there are multiple routes available from a starting location to a specific destination location.

Figure 1:
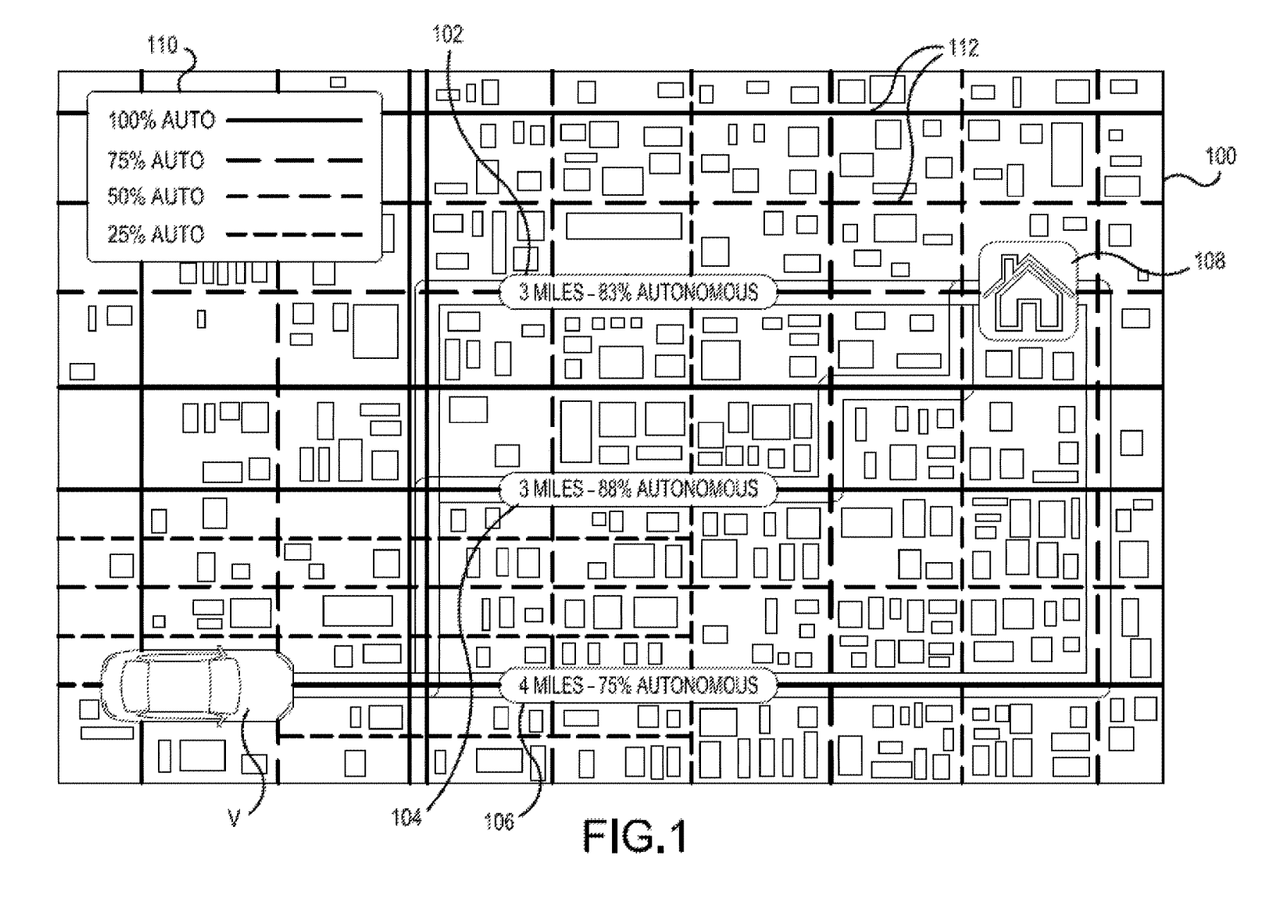
FIG. 1 illustrates an exemplary driving route map for a vehicle generated and displayed according to one embodiment, where a plurality of navigational routes are processed, evaluated and presented according to an autonomous driving value.

FIG. 1 illustrates a map 100, which may be displayed on a display screen (e.g., navigation system display screen, dedicated in-vehicle display screen, dashboard mounted display screen, heads-up display, mobile device display screen, etc.) according to certain exemplary embodiments. In the example illustrated in FIG. 1, map 100 illustrates an image of an area surrounding a vehicle V. The map 100 also illustrates a current position of the vehicle V and an icon 108 indicating a destination. The map also illustrates a number of possible routes 102, 104, 106 from a current location of a vehicle to a destination 108 (e.g., a user's home). In the example illustrated in FIG. 1, three routes are provided (102, 104, 106). It is noted however, that any suitable number of routes may be provided.

Route (or "path") planning may be defined as the process of determining a route based on and expressed in terms of an abstract world model. Algorithms may be configured to optimize a specific parameter such as a generic path cost or path length and may be classified based on the particular world model used. The specific route planning may be based on any number of approaches, including a network or graph-based approach and a grid-based approach. For network-based route planning, sometimes referred to as route planning, finds the shortest path using a network or directed weighted graph as a world model. Such approaches may be useful when the solution set for a path planning algorithm must be chosen from a fixed set of predefined paths. Furthermore, with network based analysis, no paths outside of the initial fixed set can be considered. The most recognizable application for this kind of modeling is the selection of the "best" route in a network of roads. The basic model for this application treats road intersections as graph nodes and roads as graph edges. Edge weights may be assigned based on physical properties of the road such as distance or travel time.

Network-based algorithms may use local optimization at each stage to reach a global optimum. One example utilizes Dijkstra's algorithm to compute a minimum total path cost from a source node to all other nodes in a non-negative edge weighted graph (a network) and assigns an identifier to the previous node in the shortest path to each vertex. This previous node value can be used to reconstruct the least cost path from any node back to the source. Dijkstra's algorithm can also be used to solve a directed graph shortest path problem. In the case in which a least cost path between two given vertices is required, one vertex is chosen as a source vertex and the algorithm terminates when the destination vertex is reached. Dijkstra's algorithm advantageously finds the shortest cost path from one point to another without any additional information about the graph or edge weights. However for real world route planning, Dijkstra's algorithm can be computationally inefficient because a global structure often exists that can be used to further optimize the searching algorithm.

Specifically, there may exist a simple function that gives a lower bound estimation of the graph distance between a given node and the destination node. For example, in a road network where an edge weights represent road lengths and nodes represent road intersections, the minimum possible distance between any node and the destination node is the Euclidean distance between the two corresponding intersections. The A* ("A Star") algorithm uses this minimal heuristic measurement to improve path finding efficiency over Dijkstra's algorithm. The minimal heuristic is a simplified measure that is guaranteed to be less than or equal to the shortest graph distance between two given nodes. In most route planning algorithms the Euclidean distance may be used as minimal heuristic between two nodes because it is simple and easy to calculate. However, a minimal heuristic can be any function that meets the same criteria. The speed up is largely based on the quality of the heuristic; the better the minimum heuristic estimates the shortest graph distance, the larger the speedup over standard Dijkstra's algorithm.

The A* algorithm uses two main strategies to increase efficiency. First, the A* algorithm uses the path distance from the source plus the given minimal heuristic measure to the destination to determine the search order of potential nodes. This strategy may be advantageous because this value represents the minimum possible path distance through the given node and also generally serves as a good estimation of total path length. Also, it uses the heuristic to prune the search tree of unnecessary branches by comparing the minimum possible path distance (again the path distance from the source plus the minimal heuristic) through the given node with previous computed path lengths.

Network-based path planning is very useful when there exists a fixed set of paths to choose from. But for a general case with unstructured terrain and off road driving, a grid-based path planning technique may be more appropriate. Such algorithms represent the terrain as a discrete grid where each cell has a cost to move through. The least cost path in a gridded algorithm is the collection of cells such that the cost of moving from the center of a source cell to the center of a destination cell is minimized. Most grid-based path planning algorithms are related forms of the network-based algorithms, discussed above. To apply the network based algorithm to the raster data, a node/link representation may be used. In this representation, the gridded data set forms a lattice in which each cell center represents a node with edges to its direct neighbors. Edge weights are assigned based on cost values of the two adjacent cells and the travel direction as well as other potential directional weights. Using this method GIS implementations can apply network algorithms such as A* and Dijkstra's Algorithm to solve path planning algorithms on the raster datasets.

Route planning that utilizes a grid-based path planning algorithms may include an accumulated cost surface method. This exemplary method may use a cost layer that represents the relative difficulty of moving through a particular cell and then finds the path from a source cell to a destination cell (through cell centers) that has the least total cost. This is accomplished by creating a layer, called an accumulated cost surface, in which each cell is accumulated cost of the shortest path from that cell to the given source cell. Simultaneously, a layer ("backtrack layer") is generated in which each cell represents the direction to the previous cell in the shortest path. Using this backtrack layer a least cost path can be traced from any cell back to the source cell. The accumulated surface stores the list of shortest distance values while the backtrack layer stores a value that represents the next neighbor along the least cost path. Since each cell location is only connected to its neighbors in the node/link representation, the backtrack value can be represented as an integer in the range of one to eight that specifies the specific neighbor cell along the least cost path.

Data for each of the routes may be provided from a plurality of different navigational data sources. As can be seen from FIG. 2, an exemplary configuration is provided, where data may be communicated/received from satellite data 202, a vehicle data source (e.g., Google Maps, GPS, etc.) 204, and/or a probe car 206. Satellite data 202 may comprise image data and/or other navigation, GPS and map-related data. Satellite data may be based on one or more formats or platforms including GeoEye, DigitalGlobe, SpotImage, RapidEye, Earth Resource Observation Satellites (EROS), Meteosat, and others.

The map image data illustrated in FIG. 1 may be provided via satellite or aerial photography. As will be discussed in greater detail below, tangibly embodied software and algorithms may be used to process and store aerial remote sensing data. In one exemplary embodiment, aerial LIDAR data may be used for vehicle path planning. Aerial LIDAR is especially suited to path planning for several reasons. First, aerial LIDAR data can have a very high spatial resolution and vertical accuracy. Furthermore, because aerial LIDAR records the distance to physical objects, important path planning features such potential obstacles, terrain slope, and terrain roughness can be derived from aerial LIDAR data.

A vehicle LIDAR system is configured to function on the principal of laser ranging. A laser pulse may be sent at a specific (sensor relative) angle and the time of flight is measured and used to determine a distance. Simultaneously, attitude and positional data are captured using a high accuracy GPS system (e.g., Differential or DGPS; see FIG. 2). The LIDAR scanner and the position and orientation system are preferably time synchronized. The range and angle data capture by the LIDAR system are then coordinated with the position and orientation measurements to geo-reference the laser returns. Under one exemplary embodiment, direct measurements of position and orientation are used in geo-referencing, instead of correlating data to known reference points.

Figure 2:
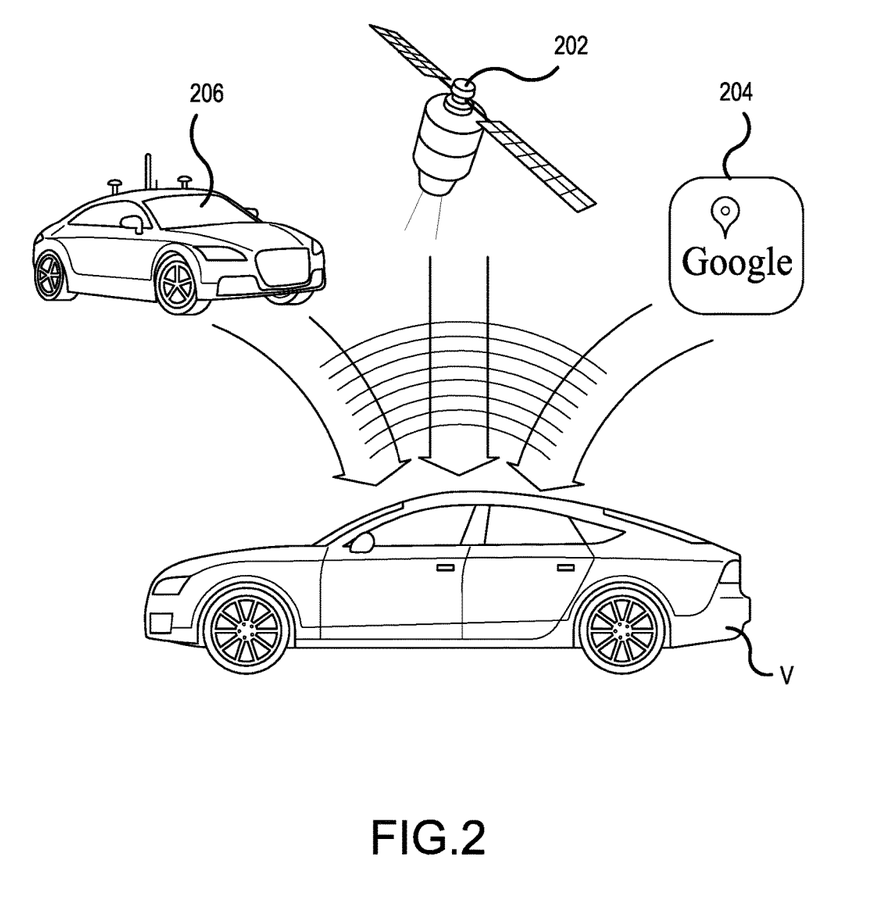
FIG. 2 illustrates exemplary data sources for a vehicle, where the data sources include satellite, vehicle data source and/or a probe car for use with navigation under certain exemplary embodiments.

In certain cases however, the map data may not be entirely accurate as the satellite image may be outdated and may not reflect a current map layout. Thus, the quality of the data may be fairly low and not accurate for determining if the vehicle can drive autonomously. In addition to the satellite imagery, data may be provided from a vehicle data source/database (e.g., Google Maps, GPS, etc.) 204. For example, a subset of the different routes that populates the area between the vehicle's current location and destination may have been stored (e.g., photographed, scanned, etc.). Again, this data may become outdated, depending on the physical changes occurring over time in the area. Lastly, data may be provided by probe cars 206, which have travelled along various routes that comprise possible routes between the vehicle's current location and destination within the last hour, and this data was subsequently uploaded to the server for autonomous driving usage. The data from each data source may be factored into the calculation of the PA value to provide an accurate picture of which routes and their constituent segments are more optimal for driving autonomously.

Using the data obtained from the data sources illustrated in FIG. 2, the system generates the map 100 illustrated in FIG. 1. Specifically, the data from the individual data sources is aggregated to obtain a most accurate depiction of the area surrounding the vehicle. The data aggregation is preferably performed on a server (e.g., incorporated into vehicle, remote server at vehicle manufacturer, etc.) using a dedicated application. The application is designed such that it will query all drivable roadways (e.g., in United States, other countries, etc.) for necessary data used for calculating a vehicle's position and orientation. Such data includes, but is not limited to, LIDAR, radar, acoustic/ultrasonic, GPS, Car-to-x, street-view, aerial and space photography. The data for calculating position and orientation will either exist or not exist for the different segments along the variably calculated routes that exist between a current location of the vehicle and a destination. Existing data from the above sources may be summed for the different segments that comprise a route between the current location of the vehicle and the destination. Based on the aggregated data, the system determines a number of possible routes (102, 104, 106) from the starting point/current location of the vehicle V to the destination 108. Each of the possible routes 102, 104, 106 in the example is displayed on the map 100 as shown. Under one exemplary embodiment, the route with the highest PA value be displayed first, followed by N items in descending order of PA.

Map 100 may be separated into a plurality of route segments 112, illustrated as a grid on map 100. For purposes of the present disclosure, a route segment is not necessarily a specific length of roadway, but rather a general term referring to any portion of roadway that can be driven on by a vehicle. Based on the aggregated data, the system determines and assigns, as detailed further below, a PA value to each of the route segments. Each route segment 112 is provided with a different line format (e.g., full line, dashed line, etc.). The map 100 may also include a legend 110 identifying the PA value associated with each line format. Once the PA value for each route segment 112 is determined, an overall PA value for each entire route is calculated. As is illustrated in FIG. 1, each potential route includes an augmented section (depicted by respective informational icons or windows in 102, 104, and 106) with information describing the route. As can be seen from the figure, the augmented section may indicate the distance the vehicle will travel along the route and the PA value for the route. The segmented section may include further information as necessary, such as the estimated amount of time the vehicle will travel along the route. The specific manner in which the map 100 and its contents are generated is discussed in further detail below.

As can be appreciated by those skilled in the art, the exemplary embodiments disclosed herein are configured to address the need for a driver of a semi-autonomous vehicle to have optional routes that vary in the amount of autonomous driving offered. One advantage in offering such options is that the driver can choose to drive a route that affords 95% or 5% autonomous driving, depending on the current needs of the driver. Additionally, it provides the driver the opportunity to trade off the length (distance and/or time) of the route against the PA value.

In certain embodiments, the system may employ a plurality of different techniques for calculating a route, which are described below. One technique assigns a continuous (c-method) value to the constituent segments of roadways in a given area and one that assigns a binary (b-method) value to the constituent segments of roadways in a given area.

A c-method may be implemented after aggregating data from the different data sources illustrated in FIG. 2. Once the data is aggregated from the different sources, the system can assign a PA value to the different route segments populating the entire section that contains the current location of the vehicle V and the destination 108, as illustrated in FIG. 1. The PA value for each route segment is calculated after data aggregation of the variable data sources used for calculating vehicle position and orientation. A particular route segment may have data for its entire length or a portion of its entire length. If data exists for the entire length of the segment, then the particular segment has a PA value of 100%. If data exists for only a portion of the route's length, then that particular segment has a PA value of N %. Lastly, all N % values may be summed across all segments of a particular route to calculate a PA value for that route. For illustration purposes only, the PA values of the route segments by themselves in FIG. 1 range from 25% to 100%. In general, a route segment with a PA of 25% can only be driven on in autonomous mode for 25% of the length of the roadway and a segment with a PA of 100% can be driven on in autonomous mode for 100% of its length. This information is now available for a routing strategy algorithm to be used in calculating a route between the current position and destination.

Figure 3:
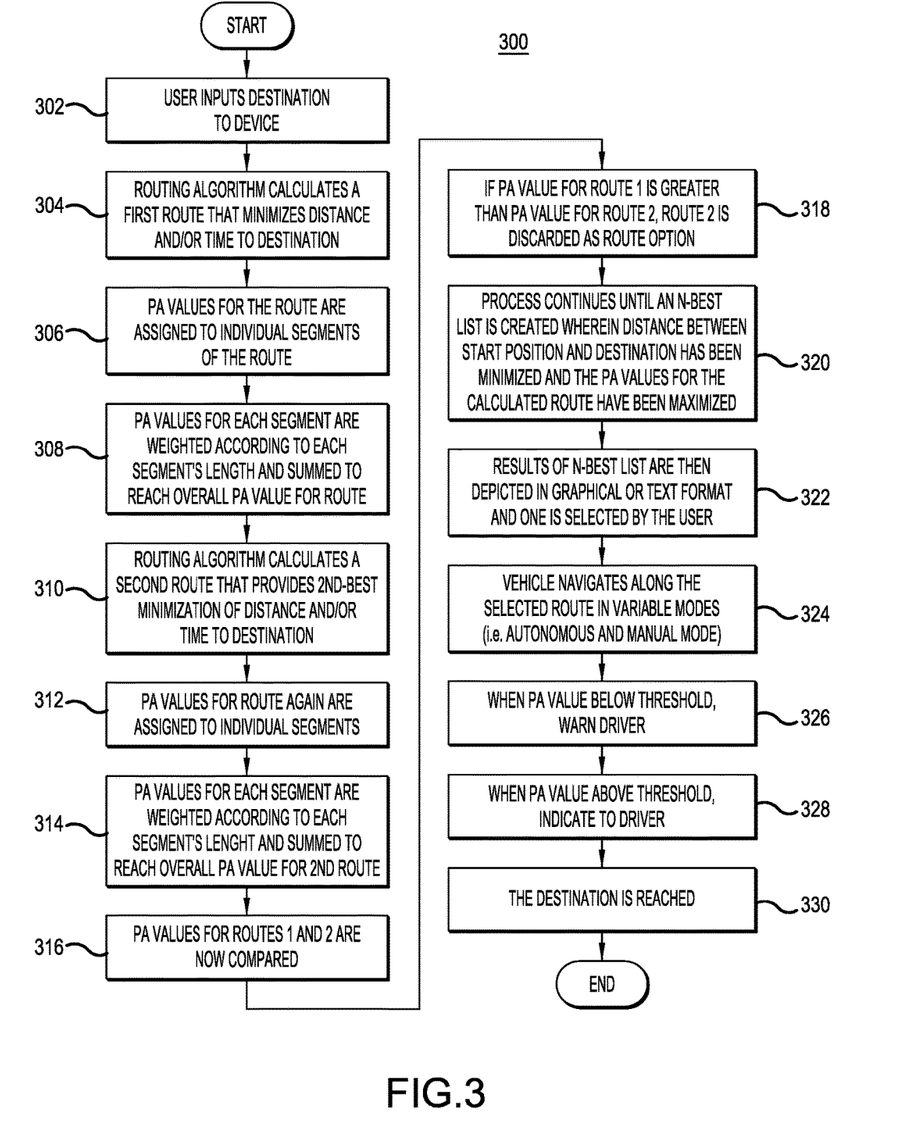
FIG. 3 illustrates an exemplary embodiment for determining and processing percent autonomous (PA) values for route navigation, where the PA values are derived from a continuous (c-method) value to constituent segments of roadways in a given area.

Turning now to FIG. 3, an exemplary method 300 is disclosed, utilizing any of the configurations disclosed above. Here, an exemplary c-method process is illustrated, where a user may input a destination location 302 using a user device, such as a smart phone, computer, vehicle infotainment system, etc. A first route is processed in the system 304, which minimizes length (e.g., distance and/or time) between a starting position and the destination location input by the user. According to certain exemplary embodiments, the route is calculated using a routing algorithm, which may include any number of software and/or hardware components.

In general, a computer program product in accordance with one embodiment comprises a tangible computer usable medium (e.g., standard RAM, an optical disc, a USB drive, or the like) having computer-readable program code embodied therein, wherein the computer-readable program code is adapted to be executed by a processor (working in connection with an operating system) to implement one or more functions and methods as described herein. In this regard, the program code may be implemented in any desired language, and may be implemented as machine code, assembly code, byte code, interpretable source code or the like (e.g., via C, C++, C#, Java, Actionscript, Objective-C, Javascript, CSS, XML, etc.). Routing algorithms may be further coupled to routing databases or libraries, such as DGLib, Graphserver, pgRouting, Libosmscout, Spacialite and GraphHopper, among others.

PA values for the calculated route are then assigned 306 to individual route segments that comprise the overall route. The PA values for each segment are then weighted 308 according to each segment's length and then summed across all segments to get an overall PA value for the calculated route. The routing algorithm 300 may calculate a second route 310 that provides the second best minimization of distance and/or time between the starting position and the destination location. PA values for the calculated route are again assigned 312 to the individual segments that comprise the route. The PA values for each segment are then weighted 312 according to each segment's length and then summed across all segments to get an overall PA value for this second route. PA values for routes one and two are then compared 314, and, if the PA value for the first route is greater than the second route, then the second route is discarded 318 as a route option. Alternatively, if the PA value for the first route is less than the second route, then the second route is kept as an option.

The process of FIG. 3 continues until an n-best list is created 320 wherein distance between start position and destination has been minimized and the PA values for the calculated routes have been maximized. The results of the n-best list are then depicted in graphical format and may be displayed on an in-vehicle display screen or mobile device display screen in the format illustrated in FIG. 1 or presented in a text format (e.g., on a user's mobile device) for selection (322).

Once a specific route is selected (e.g., by user selection), the selected route is displayed to the user and the vehicle then navigates 324 along the selected route in variable modes (e.g., autonomous and manual modes). Upon approaching a segment on the route wherein the PA value is below a certain threshold, the vehicle's human-machine interface (HMI) will warn the driver 326 ahead of time to take manual control of the vehicle. Then, upon approaching a segment on the route where the PA value is above a certain threshold, the vehicle's HMI indicates to the driver that autonomous mode can be engaged 328. The process is continued until the destination is reached 330.

Figure 4:
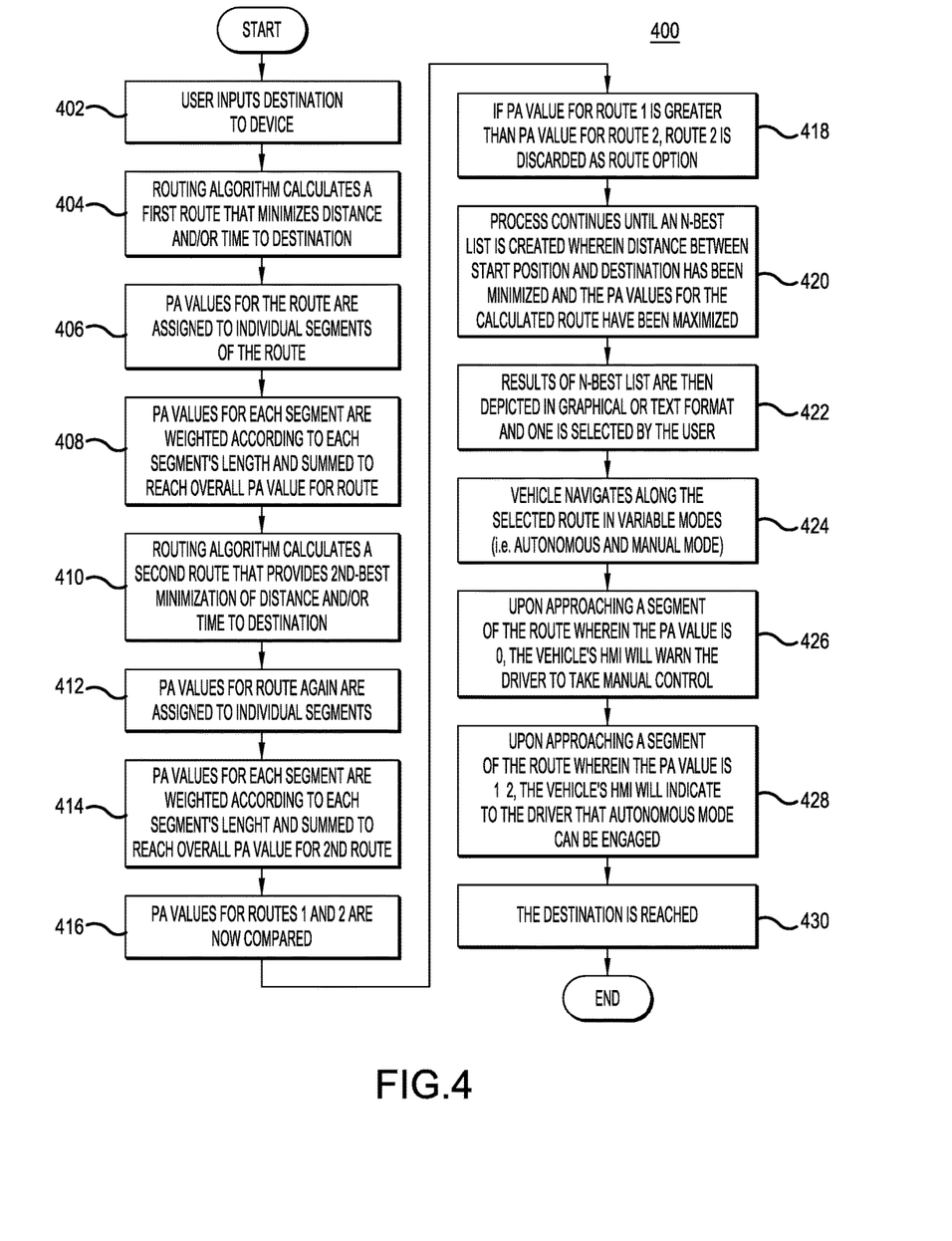
FIG. 4 illustrates an exemplary embodiment for determining and processing percent autonomous (PA) values for route and route segment navigation where the PA values are derived from a binary (b-method) value to constituent segments of roadways in a given area.

Turning to FIG. 4, an exemplary embodiment for a b-method is illustrated. The process in FIG. 4 is similar to the c-method of FIG. 3, except that the constituent segments of the route are not assigned a probabilistic value (e.g., $0.001 < p < 1.00$), but instead are assigned binary values (e.g., 1 for "yes" can be driven autonomously and 0 for "no" can't be driven autonomously). In this example, operations 402-424 and 430 are equivalent to operations 302-324 and 330 in FIG. 3 and, for purposes of brevity, the details of each will not be discussed. The operations in the b-method that differ from the operations in the c-method are operations (426) and (428). In the b-method process 400 of FIG. 4, upon approaching a segment on the route wherein the PA value is 0, the vehicle's HMI will warn the driver ahead of time 426 to take manual control of the vehicle. In operation 428, upon approaching a segment on the route wherein the PA value is 1, the vehicle's HMI indicates to the driver that autonomous mode can be engaged.

Figure 5:
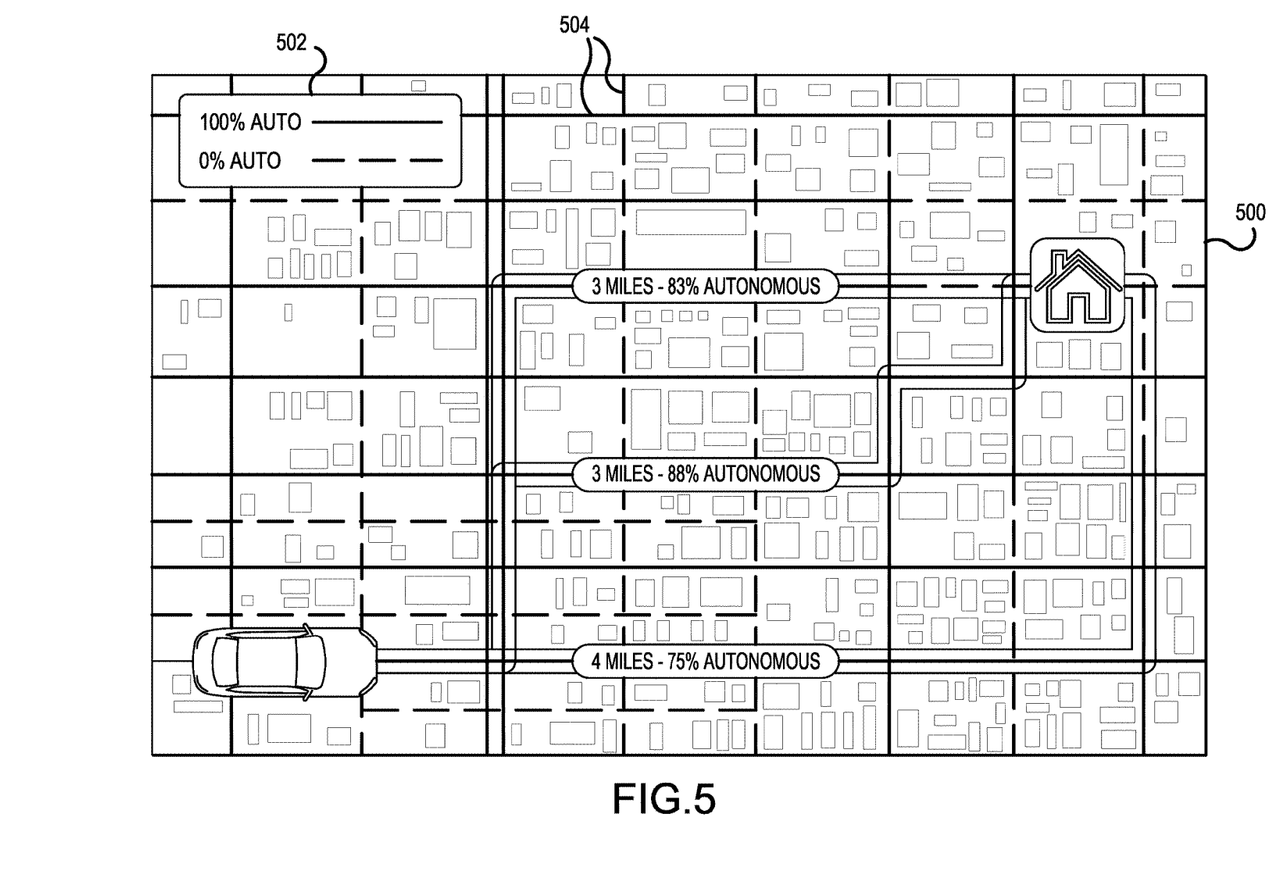
FIG. 5 illustrates an exemplary driving route map generated by the configuration illustrated in FIGS. 3 and/or 4 where a plurality of navigational routes are processed, evaluated and presented according to an autonomous driving value.

Turning now to FIG. 5, map 500 is illustrated, which may be generated using the b-method technique described above. Here, route segments 504 are identified by either a full line, indicating a PA binary value of 1, or a dashed line, indicating a PA binary value of 0. Map 500 also includes a legend 502, identifying the binary PA values. It can be appreciated by those skilled in the art that the c-method provides greater granularity in the processing and presentation of autonomous-based navigation, while the b-method provides greater simplicity. Additionally, the b-method processing may be based on a specific PA value, and/or a PA value meeting or exceeding one or more thresholds. In one example, if a PA value fails to meet or exceed a predetermined threshold value, a "0" b-method value may be assigned. Conversely, if the PA value meets or exceeds a predetermined threshold value, a "1" b-method value may be assigned.

Accordingly, the system disclosed herein may calculate n-number of routes between a starting location and a destination location wherein each successively calculated route might be a slightly longer, but the PA value of the route is increased. As such, the driver may advantageously choose from the list of alternatives presented in an "n-best" list. In one example, there might be a desire by the user to reach a destination in the shortest amount of time and/or distance, and may select the appropriate route. In another example, there may be a desire by the user to reach a destination while driving autonomously to get some work done or be entertained. The present disclosure provides techniques for maximizing the PA while minimizing the distance and/or time travelled. The decision of route selection for autonomous driving may be left up to the individual user to decide by making a selection from a n-best list. Alternatively, it is noted that the system may be configured to make a selection for the user based on a predefined balancing of PA value and time/distance travelled.

In the disclosure discussed above, the PA value is contrasted with optimal travel time and/or distance across n-options (e.g., n-best list) for purposes of making a decision about which route to choose to drive. The PA value for the c-method can be determined by the following formula:

$$PA_{road} = \sum_{seg=1}^{n} \frac{(PA_{seg} \cdot L_{seg})}{N},$$

wherein $PA_{road}$ represents an overall numerical value of a route that is composed of n segments. $PA_{seg}$ represents the percentage of a single route segment that can be driven autonomously relative to the overall length of the segment, and $L_{seg}$ is the weighting factor according the length of the segment. Lastly, the above value is divided by N, representing the total number of segments that comprise the route.

The PA value for the b-method can be determined by the following formula:

$$PA_{road} = \sum_{i_A=1}^{n} \frac{AL_{i_A}}{L_{TOT}}$$

wherein $PA_{road}$ represents an overall numerical value of a route that is composed of n segments. $AL_{i_A}$ represents the total length of roadway along a route that can be driven autonomously and $L_{TOT}$ represents the total length of roadway.

Figure 6:
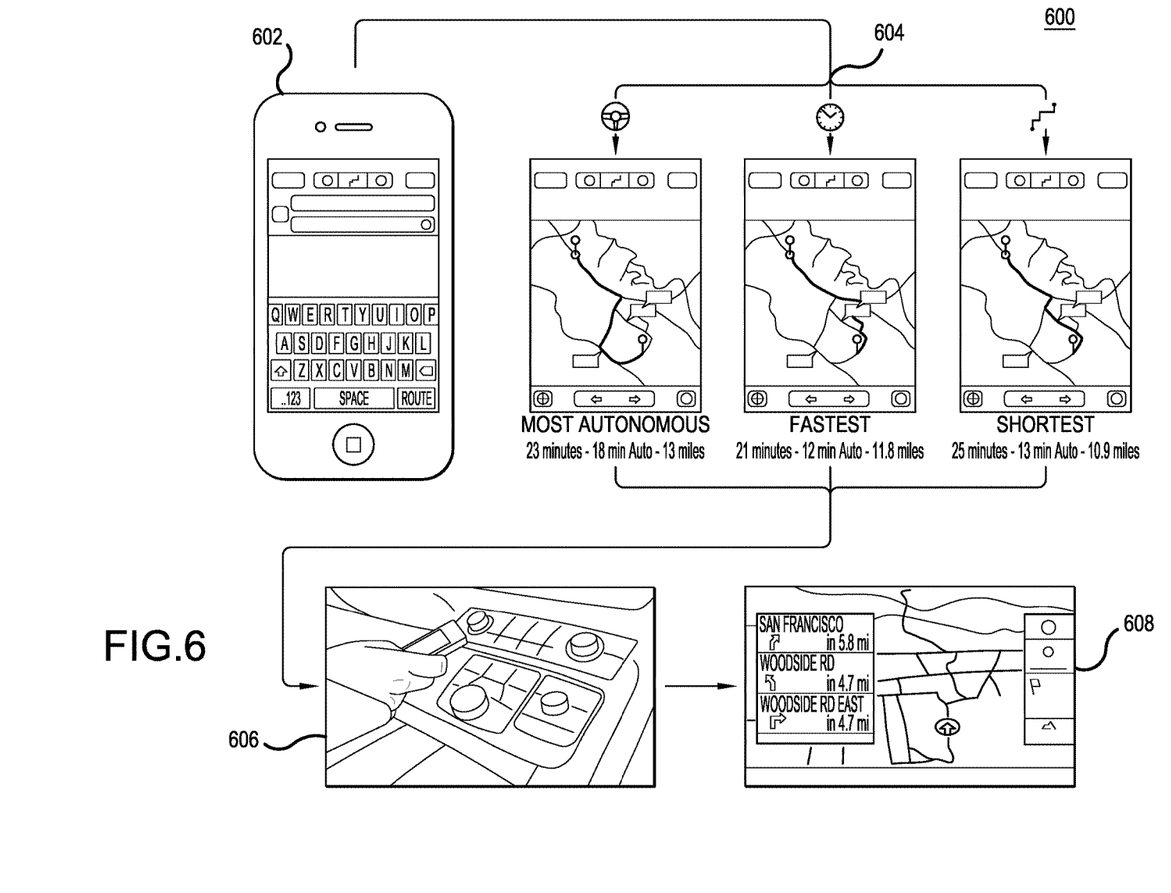
FIG. 6 illustrates an exemplary embodiment for processing and communicating routes to a user where a driver may enter a destination into a processing device, and a navigational algorithm may then calculate an n-best list of possible routes between a specified start location and destination.

FIG. 6 illustrates a use case 600 under one exemplary embodiment, where a driver may enter a destination into a processing device, such as a mobile terminal 602 (e.g., smart phone). As discussed above, the present disclosure is not limited to mobile terminals, may include other suitable devices, such as a desktop computer, laptop, or an in-vehicle navigation system. The ADRPA algorithm may then calculate an n-best list of possible routes between a specified start location and destination. The route planning process may also incorporate stopovers or waypoints such as stopping at a gas station on the way to a destination. The returned route options are then displayed to the user on a map screen that is augmented with information about each route (604).

In this example, the routes may be prioritized according to one or more characteristics, including routes that (i) afford the greatest amount of autonomous driving, (ii) provides for the least amount of travel time, and/or (iii) provide the shortest travel distance. One skilled in the art would appreciate that the results of an n-best list may be shown in many different ways. For example, the results could be shown simply in a list of text, showing a larger number (e.g., ten) of options prioritized around PA. The results could be depicted in graphic or iconic format, using color, shading, texture, type, and design to indicate the various decision parameters of PA, time, and distance. The entire application could also be incorporated into a voice user interface, such the all the user operations and application events are performed via speech input and audio output. After a route option is selected, the user in our example can simply place the mobile device near the navigation system to send the selected destination to the vehicle's navigation system via near field communication (NFC) (606) or other suitable wireless communication protocols such as Wi-Fi or Bluetooth. Lastly, the vehicle and its occupants travel to the selected destination via a combination of manual and autonomous driving modes 608.

Figure 7:
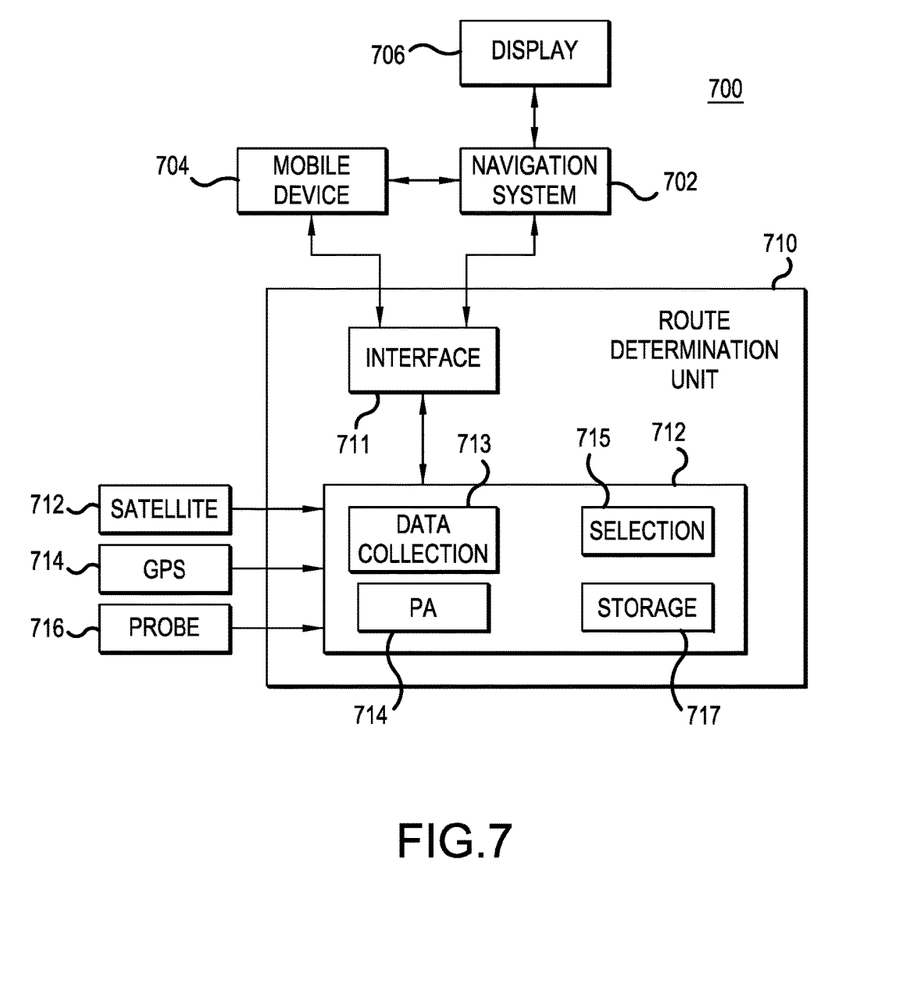
FIG. 7 illustrates a block diagram of a driving route planning system under another exemplary embodiment, where a determination unit performs navigational processing to assign a percent autonomous value and minimize a distance between a start position and a destination position and further configured to maximize the percent autonomous value assigned.

FIG. 7 illustrates an automatic driving route planning system 700 according to another exemplary embodiment. Specifically, the system 700 is configured to perform the processes and methods described above. The system includes a route determination unit 710. The route determination unit 710 includes a processing unit 712 configured to perform numerous tasks in accordance with the automatic driving route planning described above. Processing unit 712 may comprise a single dedicated hardware component, or multiple dedicated hardware components. Alternatively, the processing unit 712 may be incorporated into an integrated vehicle computing system or a vehicle navigation system. Specifically, processing unit 712 may be configured to receive inputs, both from user input and database/data source input, process the received inputs, and provides output and processing results to the user. To this end, processing unit 712 may include a data collection device 713 configured to receive and aggregate data from various sources, a PA component 714 configured to assign a percent autonomous value, an optimization/selection component

715 configured to minimize a distance between a start position and a destination position and configured to maximize the percent autonomous value assigned, and a data storage device 717 configured to store data input as well as historically driving/location/destination data. As detailed above, with respect to FIG. 2, the data collection unit 713 may be configured to receive data from a plurality of data sources including, but not limited to, a satellite source 722, a vehicle data source 724, and/or a probe car 726.

Route determination unit 710 may also be configured to interact with a mobile device (e.g., smartphone, laptop computer, etc.) 704 and a navigation system 702 of a vehicle (V). To this end, the system 700 may include an interface 711 (e.g., HMI) configured to receive and transmit data to and from the mobile device 704. As detailed above, a user may input a destination using the mobile device 704. The mobile device 704 is connectable to the interface 711 either by a direct connection (e.g., a docking station within a vehicle) or through a wireless connection. Data from the mobile device 704 may be transferred through the interface 711 for processing. Additionally, the system may provide data/results with respect to potential driving routes to the mobile device 704. The results may be presented in text format or as an image (e.g., map) to be displayed on a display screen of the mobile device. The user may then operate the mobile device 704 to select a desired route, whereby the selection is sent back through the interface 711.

Interface 711 may also be configured to receive and transmit data to and from the navigation system 702. Once a user has selected a desired route, the data corresponding to the selected route is sent to the navigation system 702. The navigation system 702 displays the selected route on an in-vehicle display screen. Additionally, in the autonomous driving mode, navigation system 702 may navigate the vehicle according to the selected route. Additionally, a user may interact with the system 700 directly through the navigation system 702 and vehicle mounted controls. Specifically, the user may enter the destination input directly through the vehicle mounted controls of the navigation system 702. Driving route options may then be displayed on the in-vehicle display 706 and the user may select a desired option using the vehicle mounted controls of the navigation system 702.

The system 700 described above may be incorporated into a vehicle. That is, the route determination unit 710 and its components may be incorporated into a vehicle. Alternatively, the route determination unit may operate as a remote system (e.g., remote from the user's vehicle). The mobile device 704 and the navigation system 702 may interact with the route determination unit 710 via wired or wireless connection.

The techniques disclosed herein may be implemented in a typical computer hardware configuration, which may be incorporated into the vehicle (or may be incorporated into the existing vehicle navigation system and/or overall vehicle computer system). Additionally, a computer-implemented method may be employed for performing at least certain operations in the present disclosure. Such a method may be implemented, for example, by operating a computer, as embodied by a digital data processing apparatus, to execute a sequence of machine-readable instructions. These instructions may reside in various types of storage media. Thus, this aspect of the present disclosure covers a programmed product, including storage media (or a storage device) tangibly embodying a program of machine-readable instructions executable by a digital data processor. As discussed above, the storage media may include, for example, a RAM contained within the CPU, as represented by the fast-access storage for example. Alternatively, the instructions may be contained in another storage media, such as a magnetic data storage diskette, compact disc, or other removable storage media/device, directly or indirectly accessible by the CPU.

As mentioned above, recent conventional advances within the navigation systems include algorithms and interfaces that perform optimization of route planning according to carbon footprint (e.g., eco-driving route planning), battery efficiency (e.g., electric vehicle route planning), comfort (e.g., scenic route planning), and safety (e.g., avoid high crime area route planning). Others have proposed various systems and methods for determining the optimum route to a destination. For example, U.S. Patent Application Publication No. 2010/0312466 proposes a device and method for calculating a route from a start to an end location, and assigns a penalty attribute to one or more segments along the route for such conditions as road construction, accidents, or heavy traffic. This penalty attribute can result in increased travel time and/or distance. Following an initial route calculation and penalty assignment, one or more alternative routes may be calculated to determine if travel time and/or distance is decreased. The user can then make a decision about which is the optimal route of travel.

U.S. Patent Application Publication No. 2002/0120396 discloses the use of historical data to allow the user to plan and optimize a route according to the user's particular preferences. A user may enter information into the system regarding areas the user would like to avoid. For example, the user may wish to avoid areas with significantly higher crime rates than the average crime rates for the region of travel. Subsequently, a user may set a route from their current start location to a destination location. If, along the calculated route, there is a traversal across an area with high crime rates, the user will then be informed and offered an alternative route. The user can again make the decision about which is the optimum route of travel.

For electric vehicle applications, U.S. Pat. No. 7,865,298 allows the driver of an electric vehicle to optimize routes for battery performance improvements. That is, the system will factor in weather conditions, traffic flow, and terrain for purposes of predicting charge depletion time, range, travel time, etc. The driver can then be informed about the impact of these variables and make a choice of an optimum route.

Furthermore, U.S. Patent Application Publication No. 2008/0183381 discloses a navigation system that is capable of making a route search by specifying the propriety of use of individual special roads (e.g., toll roads) to the destination. When the search route contains such special roads, the propriety of use of the special roads may be individually selected and the route is then researched based on the selected propriety of use for the special road.

The conventional art, however, is focused specifically on defining systems and methods for optimizing route plans with non-autonomous vehicles, meaning that routes are ultimately selected only through the physical decisions and actions of the user after taking into account historical data, weather conditions, traffic density, and a host of other variables that can impact travel time and/or distance. The conventional art, however, does not provide a system and method for planning and optimizing routes for semi-autonomous and/or fully autonomous vehicles, which limit and even eliminate the need for user interaction. Moreover, the conventional art does not factor in variables to calculate a percentage of a route that can be driven autonomously with a vehicle that has the requisite technology to do so.

The embodiments disclosed herein, thus, provide a technical effect or solution to such conventional deficiencies by providing a system and method suitable for autonomously and/or semi-autonomously planning and optimizing a route to a specific destination desired by a user In the foregoing Detailed Description, it can be seen that various features are grouped together in individual embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system for determining an optimal route to a destination position for a transportation vehicle configured to operate at least partially in an autonomous driving mode, comprising:
   a storage for storing map data;
   an input terminal for receiving navigational data from one or more navigational data sources;
   a processing apparatus, operatively coupled to the input terminal and storage, wherein the processing apparatus comprises routing means for:
     aggregating at least the navigational data to determine a location of the transportation vehicle and incorporate the determined location with the map data,
     processing the map data to determine a number of routes each having a plurality of route segments between the location of the transportation vehicle and the destination position, and
     calculating an autonomous driving value for each of the plurality of route segments based on a prediction of available autonomous driving along each route segment; and
   a display, operatively coupled to the processing apparatus for simultaneously displaying the number of routes including indication of an autonomous driving value for each route comprising a percentage of autonomous driving based on the autonomous driving value for each corresponding route segment for user selection.

2. A system for generating a navigational map using navigation information for a vehicle, comprising:
   a storage for storing map data;
   a first input terminal for receiving navigational data from one or more navigational data sources;
   a second input terminal for receiving a destination value for the vehicle; and
   a processing apparatus, operatively coupled to the first input terminal, second input terminal, and storage, wherein the processing apparatus is configured to:
     determine a location for the vehicle based on the received navigational data,
     generate a number of routes from the location to the received destination value each having a plurality of route segments,
     calculate a length value of each of the plurality of route segments,
     calculate an autonomous driving value for each of the plurality of route segments based on a prediction of a quality of autonomous driving available along each route segment, and
     process the length values and autonomous driving values with the map data to generate a navigation map comprising information relating to the autonomous driving values and length values calculated for each of the plurality of route segments, and
   a display for displaying the number of routes for user selection, wherein each of the number of routes includes an indication of an autonomous driving value comprising a percentage of autonomous driving for each route based on the autonomous driving value for each corresponding route segment.

3. A processor-based method for determining optimal routing to a destination for a transportation vehicle configured to operate at least partially in an autonomous driving mode, the method comprising:
   aggregating navigational data from one or more navigational data sources to determine a position of the transportation vehicle relative to map data;
   processing the map data to determine a number of routes from the position of the transportation vehicle to a destination each having a plurality of route segments;
   calculating an autonomous driving value for each of the plurality of route segments based on a prediction of autonomous driving available along each route segment;
   and
   displaying, by a display, the number of routes including indication of an autonomous driving value comprising a percentage of autonomous driving for each route based on the autonomous driving value for each corresponding route segment for user selection.

4. The processor-based method according to claim 3, further comprising assigning a weight to at least one of the calculated autonomous driving values for the route segments.

5. The processor-based method of claim 4, wherein the weight is based on a length of a corresponding route segment.

6. The processor-based method of claim 3, wherein calculating the autonomous driving value comprises:
   assigning a weight to the autonomous driving value for each route segment to obtain a weighted value for each route segment; and
   summing the weighted value of each route segment.

7. The processor-based method of claim 3, wherein the autonomous driving value is determined by:

$$PA_{road} = \sum_{seg=1}^{n} \frac{(PA_{seg} \cdot L_{seg})}{N},$$

wherein $PA_{road}$ represents an overall numerical value of a route composed of n route segments, PAseg represents a percent autonomous value of a single route segment, Lseg represents a weighting factor associated with a length of a segment, and N represents a number of segments in the route.

8. The processor-based method of claim 3, wherein the autonomous driving value is determined by:

$$PA_{road} = \sum_{i_A=1}^{n} \frac{AL_{i_A}}{L_{TOT}},$$

wherein PAroad represents an overall numerical value of the route that is composed of n segments, $AL_{i_A}$ represents a total length of roadway along the route that can be driven autonomously and $L_{TOT}$ represents the total length of roadway.

9. The processor-based method of claim 3, wherein each of the routes comprise at least one of (i) a different distance value and (ii) a different time value.

10. The processor-based method of claim 9, wherein determining the optimal route comprises selecting one of the routes based on at least one of the distance value and time value of the route and the autonomous driving value of the route.

11. A method for providing navigation information for a transportation vehicle, comprising:
- determining a location for the transportation vehicle based on navigational data;
- receiving a destination for the transportation vehicle;
- generating a plurality of routes from the location to the destination based on map data including the destination, each of the routes including a plurality of route segments;
- calculating a length value representing the driving distance for each of the plurality of routes;
- calculating an autonomous driving value representing the available amount of autonomous driving for each of the plurality of route segments; and
- processing the length values and autonomous driving values with the map data to generate a navigation map comprising information relating to the autonomous driving values and length values calculated for each of the plurality of routes,
- displaying, by a display, the plurality of routes including indication of an autonomous driving value comprising a percentage of autonomous driving of each route based on the autonomous driving values for each of the corresponding route segments for user selection.

12. The processor-based method of claim 11, further comprising:
- determining, for one of the plurality of route segments, if an autonomous driving value is below a predetermined threshold; and
- generating a warning if the autonomous driving value is determined to be below the predetermined threshold.

13. The processor-based method of claim 11, further comprising:
- determining, for one of the plurality of route segments, if an autonomous driving value is above a predetermined threshold; and
- generating an autonomous driving mode engagement message if the autonomous driving value determined to be above the predetermined threshold.

14. The processor-based method of claim 11, wherein the destination is received from a portable computing device.

15. The processor-based method of claim 14, wherein the generated navigational map is communicated to the portable computing device.

16. The processor-based method of claim 15, further comprising:
- receiving a navigational map route selection from the portable computing device; and
- communicating the route selection to an in-vehicle navigation system.

17. The processor-based method of claim 11, wherein displaying includes communicating the navigational map to a user.

18. The processor-based method of claim 17, wherein the navigational map is communicated to at least one of a portable computing device and an in-vehicle display screen.

* * * * *